US00RE36355E

United States Patent [19]

Kim

[11] E Patent Number: Re. 36,355

[45] Reissued Date of Patent: Oct. 26, 1999

[54] POTASSIUM BROMATE REPLACER COMPOSITION

[76] Inventor: Yoon J. Kim, 913 Frances Pkwy., Park Ridge, Ill. 60068

[21] Appl. No.: 08/666,736

[22] Filed: May 14, 1996

Related U.S. Patent Documents

Reissue of:

[64] Patent No.: 5,510,129
Issued: Apr. 23, 1996
Appl. No.: 08/308,617
Filed: Sep. 19, 1994

U.S. Applications:

[63] Continuation-in-part of application No. 08/147,995, Nov. 5, 1993, abandoned.

[51] Int. Cl.[6] ..... A21D 2/02; A21D 2/08; A21D 2/22

[52] U.S. Cl. ..... 426/19; 426/24; 426/25; 426/26; 426/62

[58] Field of Search ..... 426/19, 24, 26, 426/62, 25

[56] References Cited

U.S. PATENT DOCUMENTS

| | | | |
|---|---|---|---|
| 2,300,439 | 11/1942 | van der Lee . | |
| 2,497,035 | 2/1950 | Seeder . | |
| 4,296,133 | 10/1981 | Tanaka et al. | 426/19 X |
| 4,798,733 | 1/1989 | Kaneko et al. | 426/19 X |
| 5,049,398 | 9/1991 | Saari et al. | 426/20 |

FOREIGN PATENT DOCUMENTS 2264429 10/1992 United Kingdom .

OTHER PUBLICATIONS

Silverblatt et al, "The Kinetics of the Reaction Between Ascorbic Acid and Oxygen in The Presence of Copper Ion", J. Am. Chem. Soc., Feb. 1943, vol. 65, pp. 137–141.

Nanda et al, "Malate Complex of Copper" J. Indian Chem. Soc., 1958, vol. 35, pp. 355–360.

Pyler, *Baking Science & Technology*, 1973, vol. 1, pp. 264–265 & 322–323, Siebel Publishing Co., Chicago, Ill.

Jackel, "Ascorbic Acid as a Basic Dough Conditioner"; Bakery Production and Marketing, Feb. 1979, pp. 88–89, 92–93.

Kulp, "Oxidation In Baking Process", American Institute of Baking, 1981, Technical Bulletin, vol. III, issue 6, p. 1–5.

Fleischmann's Yeast, "Benchmate No–Bro Tablets", Sales & Technical Data Sheet, 1993, Jun. 15.

Kamman, "Oxidation The Do's and Don'ts", *Bakers Digest*, Nov. 13, 1984, pp. 18–20.

Bobtelsky et al, "The Metallic Complexes of Tartrates and Citrates, Their Structure and Behavior In Dilute Solutions I. The Cupric and Nickelous Complexes", J. Amer. Chem., vol. 6, Oct. 1945, pp. 1824–1831.

Table I, "Properties of Some Common Food Acidulants" & Table IV, "Some Natural Acids of Fruits and Vegetables", pp. 7 and 44.

Van Wazer, "Chemistry of the Phosphates and Condensed Phosphates", *Phosphates In Food Processing*, Avi Publishing Co., pp. 7–21, 1971.

*Primary Examiner*—Arthur L. Corbin

[57] ABSTRACT

A method of preparing potassium bromate replacer comprising an ascorbic acid composition in an effective amount to replace an oxidizing agent of potassium bromate is disclosed. The potassium bromate replacer essentially comprises ascorbic acid, food acid, and/or phosphate. It is a slow acting oxidant that is functional throughout the entire manufacturing process. It is also an effective oxidant that produces properly oxidized dough needed in the production of high quality, yeast-leavened products using various methods of the breadmaking process.

9 Claims, No Drawings

POTASSIUM BROMATE REPLACER COMPOSITION

Matter enclosed in heavy brackets [ ] appears in the original patent but forms no part of this reissue specification; matter printed in italics indicates the additions made by reissue.

This is a [continuation] *continuation-in-part* of application Ser. No. 08/147,995, filed Nov. 5, 1993*, now abandoned.*

BACKGROUND

1. Field of the Invention

The present invention relates to oxidizing agent replacers and to their methods of preparation. More specifically, the present invention relates to a potassium bromate replacer comprising an ascorbic acid composition that replaces an oxidizing agent of potassium bromate and to methods for their preparation.

2. Background of the Invention

Oxidizing agents provide strengthening of dough during the manufacturing process of yeast-leavened products. As a result, oxidizing agents are used to provide greater loaf volume, improve internal characteristics such as grain and texture, and enhance symmetry and keeping quality of yeast-leavened products.

The manufacturing process of yeast-leavened products benefits from the effect of a dough oxidizing agent in the mixing, proofing, baking, and/or other stages of the process. Oxidizing agents are similar in contributing to the strengthening of dough but have different rates of reaction. For example, oxidizing agents such as potassium iodate, azodicarbonamide, and ascorbic acid are fast acting and mainly functional during mixing and to a slight extent during proofing, but are largely dissipated during the later stages of proofing and the early stages of baking. Potassium bromate is a slow acting oxidant and mainly functional during the later stages of proofing and the early stages of baking. Thus, the baker can combine fast and slow acting oxidants to provide adequate strengthening of dough throughout the entire manufacturing process. However, these combined oxidants have disadvantages because they become chemical additives, thereby requiring full labelling by complete chemical name. The present invention has advantages of using ascorbic acid as the only oxidizing agent and providing adequate strengthening of dough throughout the entire manufacturing process.

Food and Drug Administration (FDA) regulations also limit the levels of all oxidizing agents permitted for use in yeast-leavened products, except ascorbic acid. The bromates and iodates should not exceed 75 ppm (parts per million) by weight of flour used in the formula. Azodicarbonamide may be used in addition to bromates and iodates at a level of not more than 45 ppm. Currently, no limitation for ascorbic acid exists except "safe and suitable", although previously this was specified as 200 ppm maximum. Thus, the present invention is particularly useful that it provides natural ascorbic acid as the only oxidizing agent in dough that is effective and functional throughout the entire manufacturing process.

In order to allow ascorbic acid to be functional during the early stage of baking, ascorbic acid can be encapsulated with high-melting point fat that will not melt until the baking stage has reached the adequate temperature in the oven. The ascorbic acid can also be coated with 2 to 3% edible cellulose to obtain longer shelf life during storage than uncoated ascorbic acid. Both encapsulated and coated ascorbic acids have disadvantages as these are not functional during the later stages of proofing. The present invention has the advantage of using unmodified ascorbic acid that is functional throughout the entire manufacturing process. However, coated ascorbic acid can also be used in accordance with the teachings of the present invention to increase the shelf life of ascorbic acid.

Due to its natural status, the only oxidizing agent approved in many parts of the world is ascorbic acid. Potassium bromate is a major oxidant used in the United States, although its use has been banned in the State of California.

Oxidizing agents that do not contain potassium bromate are now available to the baker in powdered and tablet forms. In addition to ascorbic acid and/or azodicarbonamide, potassium bromate replacers contain calcium peroxide, L-cystein, fungal enzymes, and other edible excipients. As more bakers are replacing potassium bromate with ascorbic acid only or potassium bromate replacers, they are discovering that product quality has suffered. Continuously mixed and frozen doughs seem to have suffered the most. Thus, a need exists in the baking industry for an effective [potassiu] *potassium* bromate replacer to produce high quality, yeast-leavened products. As a result, much effort has been directed to provide an oxidizing agent that replaces potassium bromate.

To function as a potassium bromate replacer, many known compositions that are currently in use include ascorbic acid as the only oxidizing agent or combine ascorbic acid with other oxidizing agents and/or ingredients. However, these potassium bromate replacers have disadvantages because these have a fast or intermediate reaction rate and thus, they are not functional during the later stages of proofing or the early stages of baking.

Given the state of the existing potassium bromate replacers, these is a continuing need for a new and effective potassium bromate replacer using ascorbic acid as the only oxidizing agent that is functional throughout the entire manufacturing process of yeast-leavened products. Accordingly, it is an object of the present invention to provide an effective potassium bromate replacer.

It is another object of the present invention to provide an ascorbic acid composition suitable in the preparation of the potassium bromate replacer and methods for their preparation.

It is a further object of the present invention to provide the ascorbic acid composition that acts as a slow acting oxidant that is functional throughout the entire manufacturing process.

It is a further object of the present invention to provide properly oxidized dough needed in the production of high quality, yeast-leavened products using ascorbic acid as the only oxidizing agent.

By achieving the objects in accordance with the purpose of the invention, the present invention overcomes many disadvantages of the potassium bromate replacers or other oxidizing agents that are currently in use. The advantages of the potassium bromate replacer provided in the present invention are:

(a) It comprises all natural ingredients.

(b) It is a slow acting oxidant that is functional throughout the entire manufacturing process.

(c) It is an effective oxidant that produces properly oxidized dough needed in the production of high quality, yeast-leavened products.

(d) It is specifically adapted for various methods of the breadmaking process.

Furthermore, the potassium bromate replacer provided in the present invention is a more effective oxidant than potassium bromate because potassium bromate has little effect on oxidation of dough during mixing and the early stages of proofing.

SUMMARY OF THE INVENTION

The present invention relates to potassium bromate replacer comprising an ascorbic acid composition that replaces an oxidizing agent of potassium bromate. The potassium bromate replacer essentially comprises ascorbic acid, food acid, and/or phosphate.

In methods for preparing the ascorbic acid composition, it has been discovered that a food acid added in an effective amount slows down oxidation of ascorbic acid to dehydroascorbic acid in a dough and thus, ascorbic acid is changed to a slow acting oxidant that is functional throughout the entire manufacturing process. Now ascorbic acid and food acid replace potassium bromate. It has also been found that a phosphate added in an effective amount enhances complexing power of the food acid. This increase in an amount of copper-food acid complex formed during the mixing stage of dough is particularly beneficial to continuously mixed and frozen doughs which require a high level of oxidant. Thus, ascorbic acid combined with a food acid and a phosphate is an effective oxidant that produces properly oxidized dough needed in the production of high quality, yeast-leavened products using various methods of the breadmaking process.

DETAILED DESCRIPTION OF THE INVENTION AND PREFERRED EMBODIMENTS

The present invention relates to potassium bromate replacer that comprises an ascorbic acid composition. The present invention relates further to the ascorbic acid composition suitable in the preparation of potassium bromate replacer and to methods for their preparation. The methods for preparing the ascorbic acid composition and potassium bromate replacer and the investigation results of how ascorbic acid is oxidized to dehydroascorbic acid in dough are described in detail below.

It is known to use all forms of ascorbic acid, organic acids, or phosphates (see, for example, U.S. Pat. No. 4,296,133, issued Oct. 20, 1981 to Tanaka et al. entitled "Method for Producing Bread") as additives to improve overall quality of breads or doughnuts. However, previous inventors or authors do not use ascorbic acid, food acid, or phosphate in dough as taught by the present invention. In the present invention, the ascorbic acid composition comprising ascorbic acid, food acid, and phosphate is used as oxidizing agent replacers of potassium bromate but not as additives. More specifically, ascorbic acid, food acid, and phosphate are used to replace potassium bromate.

Throughout the specifications and claims, yeast-leavened products are those prepared by forming a dough having flour, farinous material, yeast, and water. A manufacturing process for making yeast-leavened products is defined as forming a dough by the steps or stages of mixing, proofing, and baking, or if the dough is frozen, the stages of mixing, freezing, thawing, proofing, and baking. A breadmaking process means various methods such as Straight dough, Sponge dough, Liquid ferment, No time dough, Frozen dough, and Continuously mixed dough. Percentages are baker's formula percentages, that is, parts of weight per 100 parts flour. The wheat flour was milled from spring wheat and had 0.47% ash and 12.3% protein. No oxidizing agents were added in the flour mill.

Investigation of Ascorbic Acid Oxidation in Dough

To act as an oxidizing agent, ascorbic acid is first oxidized to dehydroascorbic acid in dough. Although it is agreed that ascorbic acid is an effective oxidant during mixing and the early stages of proofing, scientists do not agree on exactly what makes it work. A general belief is that enzymes present in flour oxidize ascorbic acid to dehydroascorbic acid in dough in the presence of oxygen.

This oxidation reaction by molecular oxygen is accelerated by trace metal ions such as copper or iron ion. Inhibiting the effect of metal ions can be accomplished by adding a chelating agent to form complexes that have little or no catalytic effects on the oxidation reactions.

Since metal ions such as copper and iron are present in flour as natural biological components, the mechanism for this metal-catalyzed oxidation of ascorbic acid in dough can be tested by adding chelating agents such as sodium acid pyrophosphate or sodium hexametaphosphate to a yeast-leavened product mix formula. The bread mix formula for making a dough are presented in Table 1.

TABLE 1

| Ingredient (in baker's %) | Bread mix formula |
|---|---|
| Flour | 100.0 |
| Compressed yeast | 4.0 |
| Sugar | 6.0 |
| Salt | 2.0 |
| Oil | 3.0 |
| Yeast food | 0.5 |
| Asorbic acid | 75 ppm |
| Water | 62.0 |

Adding 0.1 to 0.2 parts sodium acid pyrophosphate or sodium hexametaphosphate per 100 parts flour to bread mix formula of Table 1 produced soft, sticky, weak, and not easily machineable dough which are typical characteristics of underoxidized dough, as compared to the control dough which did not contain chelating agents.

Making metal ions inactive decreased oxidation of ascorbic acid to dehydroascorbic acid in dough during the mixing stage, thereby producing underoxidized dough. The results of this investigation illustrate that ascorbic acid in dough is oxidized to dehydroascorbic acid by a metal-catalyzed reaction. The copper (1.5 ppm) and iron (7.4 ppm) contents present in patent bread flour as intrinsic biological components act as catalysts for oxidations of ascorbic acid in dough, occurring readily by aerobic oxidation as well as anaerobic oxidation. The fast complex formation with sodium acid pyrophosphate or sodium hexametaphosphate and metal ions did not produce properly oxidized dough during the mixing stage of dough, indicating that both of these phosphates cannot be used to slow down oxidation rates of ascorbic acid in dough.

Food acids also have this chelation property. The food acids used as acidulants inactive metal ions by forming the copper-food acid complex that is dependent on the pH value of food products. Thus, the extent of this complex increases with increasing pH and the complex dissociates into the copper ion and the food acid with decreasing pH. For example, the dissociation constant of the [cooper-malate] *copper-malate* complex at a pH of 3 to 4 is reported as $3.89\times$[10$_{-5}$.]*$10^{-5}$*. At a pH between 6 and 8 copper ion exists only as the copper-malate complex. Thus, it is desirable to have a pH lower than 6 in the dough of yeast-leavened products.

Preparation of Ascorbic Acid Composition

The investigation results of ascorbic acid oxidation in dough illustrate that binding metal ions during the mixing stage of dough and freeing these ions during the later stage of manufacturing process can slow down catalytic effects of metal ions on the oxidation rates of ascorbic acid in dough throughout the entire manufacturing process. There are changes in the pH value of a dough by yeast fermentation or heat during the manufacturing process of yeast-leavened products. Thus, the pH dependency of metal ion-food acid complex has a role in the preparation of an ascorbic acid composition that slows down oxidation of ascorbic acid to dehydroascorbic acid in dough.

With some exception of sponge or liquid ferment, the pH value of freshly mixed dough is between 5.0 and 5.3. This means that a food acid added to the bread mix formula given in Table 1 forms complexes with copper or iron ion present in flour during the mixing stage of dough, thereby making these ions inactive. These complexes formed dissociate into copper or iron ion and the food acid due to the gradual decrease in the pH value of dough by yeast fermentation during the later stages of manufacturing process, thereby freeing these ions and making these ions again act as catalysts for oxidation of ascorbic acid to dehydroascorbic acid in dough throughout the entire manufacturing process. Accordingly, a food acid slows down oxidation of ascorbic acid to dehydroascorbic acid in dough by forming metal ion-food acid complex during the mixing stage of dough and gradually dissociating into free metal ion and food acid during the later stages of the manufacturing process. Thereby, ascorbic acid is changed from a fast acting oxidant to a slow acting oxidant. Thus, ascorbic acid combined with a food acid acts as a slow acting oxidant that is functional throughout the entire manufacturing process.

Ascorbic acid used in the present invention is L-ascorbic acid that acts as an oxidizing agent in dough. Ascorbic acid incorporated into a yeast-leavened product mix formula ranges from about 10 ppm to 300 ppm, preferably about 15 ppm to 250 ppm by weight of flour.

Food acids are found in fruits, vegetables, their juices, and many other fermented products. Some examples of food acids are acetic, citric, fumaric, lactic, malic, oxalic, phosphoric, succinic, tartaric, apple juice concentrate, orange juice concentrate, lemon juice concentrate, and wine. Citric acid, malic acid, apple juice concentrate, and orange juice concentrate are preferred. Food acid ranging from about 0.015 to 0.20 parts, preferably about 0.02 to 0.15 parts per 100 parts flour is added to a yeast-leavened product mix formula.

In addition to emulsifying protein or strengthening gluten structure of dough, the use of phosphate in the present invention has an additional benefit. The addition of phosphate increased the pH value of the dough to about 0.1 to 0.3 units. The complex formation with food acid and metal ion increases with increasing pH. Thus, phosphate enhances complexing power of the food acid. The phosphate used are dibasic or tribasic phosphate such as dipotassium phosphate, disodium phosphate, trisodium phosphate, and tripotassium phosphate. Dibasic phosphate is preferred. Phosphate ranging from about 0.1 to 0.5 parts, preferably about 0.15 to 0.40 parts per 100 parts flour is added to a yeast-leavened product mix formula.

Preparation of Potassium Bromate Replacer

The present invention relates further to the ascorbic acid composition suitable in the preparation of potassium bromate replacer and to methods for their preparation. The ascorbic acid composition provided in the present invention consists essentially of comprises ascorbic acid, food acid, and phosphate.

As illustrated in the preparation of ascorbic acid composition, a food acid added in an effective amount allows ascorbic acid to oxidize at a slow rate in a dough. Thus, ascorbic acid acts as a slow acting oxidant that is functional throughout the entire manufacturing process. Now ascorbic acid and food acid replace an oxidizing agent of potassium bromate.

The phosphate enhances complexing power of food acid by increasing the pH value of a dough. This increase in an amount of metal ion-food acid complex formed during the mixing stage of dough enables the baker to use a high level of oxidant without fear of producing overoxidized dough. Thus, the use of phosphate is particularly beneficial to continuously mixed and frozen doughs which require a high level of oxidant. Accordingly, ascorbic acid combined with a food acid and a phosphate is an effective potassium bromate replacer that produces properly oxidized dough needed in the production of high quality, yeast-leavened products using various methods of the breadmaking process.

Commercial Application

Yeast-leavened products could not be made as economically as they are if suitable oxidizing agents were not available to the baker. Without proper oxidation of dough, costly, high protein flour may be needed and absorption may have to be lowered. Dough made without an oxidizing agent tends to be more sticky and more difficult to handle, leading to lower production rates.

The present invention is uniquely useful for manufacturing yeast-leavened products without using chemical oxidizing agents or additives at the levels specified by the FDA, permitting the baker to produce high quality products using only natural ingredients. Thus, consumers buy natural baked goods at lowest reasonable cost.

Using the preceding description, the baker can utilize the present invention to produce high quality, yeast-leavened products without further elaboration. The following preferred embodiments are presented as merely illustrative, but is not specifically limited to the example described below.

EXAMPLE 1

| Ingredient | Bread Mix | | Potassium Bromate Replacer | |
|---|---|---|---|---|
| (in baker's[4)] %) | Formula | Control | I | II |
| Flour | 100.0 | | | |
| Compressed yeast | 4.0 | | | |
| Sugar | 6.0 | | | |
| Salt | 2.0 | | | |
| Oil | 3.0 | | | |
| Yeast food | 0.5 | | | |
| Water | 62.0 | | | |
| Asorbic acid | | 75 ppm | 75 ppm | 100 *ppm* |
| Citric or Malic acid | | | 0.08 | 0.1 |
| Dipotassium phosphate | | | | 0.2 |

As shown in Example I, Potassium bromate replacer I comprises ascorbic acid and food acid. Potassium bromate replacer II comprises ascorbic acid, food acid, and phosphate. Conventional dough process such as straight dough or sponge dough requires a low level of oxidant and thus, potassium bromate replacer I is recommended. However, continuously mixed and frozen doughs require a high level of oxidant and thus, potassium bromate replacer II is recommended.

The control dough was prepared by adding ascorbic acid to the bread mix formula listed in Example I. The effectiveness of potassium bromate replacer I or II was tested by adding these replacers to the bread mix formula listed in Example 1. Bread was made according to the No time dough process at a commercial bakery. The dough was mixed for 15 minutes, rested for 20 minutes, then divided and placed through the usual No time dough processing steps.

The investigation conducted with various food acids found differences in the reaction rate of complexes formed in dough during a 15 minute mixing stage. One example of food acids is 80% phosphoric acid. The addition of phosphoric acid to the control dough formed the copper-phosphorate complex at a fast rate during a 15 minute mixing stage, making the dough unsuitable by producing underoxidized dough and unsatisfactory bread. Another example of food acids is 20% liquid vinegar (acetic acid). There was enough copper-acetate complex formed during a 15 minute mixing stage. Proofing to a standard height produced excellent oven spring. Bread volume was good to excellent but had slightly coarse grain. Acetic acids formed by yeast fermentation seem to accelerate the dissociation of the copper-acetate complex during proofing, resulting in slightly coarse grain. The control containing 0.2 to 0.3 parts apple juice concentrate (70%) per 100 parts flour produced quality bread having good volume, fine grain and texture, and pleasant aroma.

Accordingly, if the effective amount of a food acid such as citric acid, malic acid, fruit juice concentrate or wine is used in combination with ascorbic acid in dough, the oxidation of ascorbic acid to dehydroascorbic acid in dough is slowed down and the properly oxidized dough is produced throughout the entire manufacturing process of yeast-leavened products. The dough proofed to a standard height showed good oven spring and the bread was of high quality in volume, symmetry, grain and texture. However, the use of food acid which forms complexes at a fast rate produced underoxidized dough and unsatisfactory bread, the use of food acid which forms complexes at a [low] *slow* rate produces overoxidized dough and also produced unsatisfactory bread. Underoxidized dough is not easily machineable but if the dough is overproofed, the bread had a satisfactory volume but poor symmetry.

The investigation results illustrate that oxidation of ascorbic acid to dehydroascrobic acid in dough occurs readily by aerobic oxidation as well as anaerobic oxidation. Even in the presence of air, oxidation of ascorbic acid proceeds largely by a nonenzymatic mechanism. Traces of copper not only catalyze aerobic oxidation of ascorbic acid but also initiate reactions leading to a secondary oxidation of ascorbic acid under anaerobic conditions.

About 20% of flour bulk is made up of air. The iron salts have an accelerating effect on copper-catalyzed oxidation of ascorbic acid, although iron alone has little effect. The iron content of flour can be increased by enriching flour with Ferrous Sulfate. Thus, even in an enclosed chamber of continuous mixing systems, the combined use of ascorbic acid, food acid, phosphate, and ferrous sulfate as an enrichment in continuously mixed dough allows bakers to produce properly oxidized dough for production of quality bread.

Frozen dough requires a high level of oxidant. Frozen dough containing ascorbic acid, food acid, and phosphate produced good oven spring and quality bread.

Summarizing, it has been discovered that a food acid added in an effective amount slows down oxidation of ascorbic acid to dehydroascorbic acid in a dough, thereby ascorbic acid is changed to a slow acting oxidant and a phosphate increases the amount of complex formation with food acid and metal ion. Thus, the ascorbic acid composition essentially comprises ascorbic acid, food acid, and phosphate and replaces an oxidizing agent of potassium bromate or other oxidizing agents. The potassium bromate replacer provided in the present invention is a more effective oxidant that potassium bromate because potassium bromate has little effect on oxidation of dough during mixing and the early stages of proofing. Ascorbic acid, food acid, and phosphate are considered to be generally recognized as safe (GRAS). Thus, there are no limits on usage levels. Utilizing the present invention, bakers can now produce natural baked goods of high quality at the lowest reasonable cost to meet the consumer's demand.

Many modifications and variation of the present invention are possible in light of the above teachings. Variations may be made in proportions, procedures, and materials without departing from the scope of this invention which is defined the appended claims.

What is claimed is:

1. A potassium bromate replacer composition [comprising an ascorbic acid composition in an effective amount to replace an oxidizing agent of potassium bromate, said ascorbic acid composition comprising] *consisting essentially of, by weight*:

(a) about [15] *0.001* to [250 ppm] *0.03 parts* ascorbic acid [by weight of flour]*as an oxidant per 100 parts flour*, (b) about [0.02] *0.015* to [0.15] *0.2* parts food acid per 100 parts flour, *said food acid selected from the group consisting of acetic acid, citric acid, fumaric acid, lactic acid, malic acid, oxalic acid, phosphoric acid, succinic acid, tartaric acid, fruit juice, fruit juice concentrate, vinegar, wine, and mixtures thereof,* [and]

(c) about [0.15] *0.1* to [0.40] *0.5* parts phosphate per 100 parts flour[.], *and*

(*d*) *flour.*

[2. The composition of claim 1, wherein said food acid is selected from the group consisting of acetic acid, citric acid, fumaric acid, lactic acid, malic acid, oxalic acid, tartaric acid, apple juice concentrate, orange juice concentrate, and mixtures thereof.]

3. The composition of claim 1, wherein said phosphate is selected from the group consisting of dipotassium phosphate, disodium phosphate, trisodium phosphate, tripotassium phosphate, and mixtures thereof.

*4. The composition of claim 1, wherein said phosphate enhances the complexing power of the food acid.*

*5. A potassium bromate replacer composition consisting essentially of, by weight:*

(*a*) *about 0.001 to 0.03 parts ascorbic acid as an oxidant per 100 parts flour,*

(*b*) *about 0.015 to 0.2 parts food acid per 100 parts flour, said food acid selected from the group consisting of acetic acid, citric acid, fumaric acid, lactic acid, malic acid, oxalic acid, phosphoric acid, succinic acid, tartaric acid, fruit juice, fruit juice concentrate, vinegar, wine, and mixtures thereof, and*

(*c*) *flour.*

*6. The composition of claim 5, wherein said food acid slows down oxidation of ascorbic acid to dehydroascorbic acid during a manufacturing process of yeast-leavened products.*

*7. The composition of claim 5, wherein said ascorbic acid acts as a slow acting oxidant that is functional throughout the entire manufacturing process of yeast-leavened products.*

*8. The composition of claim 5, wherein said ascorbic acid is a more effective oxidant than ascorbic acid when used*

*alone during a manufacturing process for making yeast-leavened products.*

*9. A potassium bromate replacer composition consisting essentially of, by weight:*

(*a*) *about 0.001 to 0.03 parts ascorbic acid as an oxidant per 100 parts flour,*

(*b*) *about 0.015 to 0.2 parts food acid per 100 parts flour, said food acid selected from the group consisting of acetic acid, citric acid, fumaric acid, lactic acid, malic acid, oxalic acid, phosphoric acid, succinic acid, tartaric acid, fruit juice, fruit juice concentrate, vinegar, wine, and mixtures thereof,*

(*c*) *about 0.1 to 0.5 parts phosphate per 100 parts flour,*

(*d*) *about 0.5 parts yeast food per 100 parts flour, and*

(*e*) *flour.*

*10. A potassium bromate replacer composition consisting essentially of, by weight:*

(*a*) *about 0.001 to 0.03 parts ascorbic acid as an oxidant per 100 parts flour,*

(*b*) *about 0.015 to 0.2 parts food acid per 100 parts flour, said food acid selected from the group consisting of acetic acid, citric acid, fumaric acid, lactic acid, malic acid, oxalic acid, phosphoric acid, succinic acid, tartaric acid, fruit juice, fruit juice concentrate, vinegar, wine, and mixtures thereof,*

(*c*) *about 0.5 parts yeast food per 100 parts flour, and*

(*d*) *flour.*

* * * * *

US00RE36355F1

(12) EX PARTE REEXAMINATION CERTIFICATE (6727th)

United States Patent

Kim

(10) Number: US RE36,355 F1

(45) Certificate Issued: Mar. 31, 2009

(54) POTASSIUM BROMATE REPLACER COMPOSITION

(76) Inventor: Yoon J. Kim, 913 Frances Pkwy., Park Ridge, IL (US) 60068

Reexamination Request:
No. 90/007,671, Aug. 17, 2005

Reexamination Certificate for:

| | |
|---|---|
| Patent No.: | **Re. 36,355** |
| Issued: | **Oct. 26, 1999** |
| Appl. No.: | **08/666,736** |
| Filed: | **May 14, 1996** |

Related U.S. Patent Documents

Reissue of:

| | |
|---|---|
| (64) Patent No.: | **5,510,129** |
| Issued: | **Apr. 23, 1996** |
| Appl. No.: | **08/308,617** |
| Filed: | **Sep. 19, 1994** |

Related U.S. Application Data

(63) Continuation-in-part of application No. 08/147,995, filed on Nov. 5, 1993, now abandoned.

(51) Int. Cl.

| | |
|---|---|
| ***A21D 2/22*** | (2006.01) |
| ***A21D 2/02*** | (2006.01) |
| ***A21D 2/14*** | (2006.01) |
| ***A21D 2/00*** | (2006.01) |

(52) U.S. Cl. ..... 426/19; 426/24; 426/25; 426/26; 426/62

(58) Field of Classification Search ..... None
See application file for complete search history.

(56) References Cited

U.S. PATENT DOCUMENTS

| | | | |
|---|---|---|---|
| 2,149,682 | A | 3/1939 | Jorgensen |
| 3,594,180 | A | 7/1971 | Hulse et al. |
| 4,028,471 | A | 6/1977 | Krum et al. |
| 4,229,480 | A | 10/1980 | Suggs et al. |
| 4,477,479 | A | 10/1984 | Jervis et al. |
| 4,590,076 | A | 5/1986 | Titcomb et al. |
| 5,338,552 | A | 8/1994 | Nasu et al. |

OTHER PUBLICATIONS

Patent Owner's comments submitted on Oct. 28, 2006 in response to "On the Rise", posted on "The Patent Prospector" page of the Patenthawk.com website (Oct. 28, 2006).*

The Conformational Structure of Wheat ProLeins by Donald D. Kasarda.

Hoseney's baking tests submitted to the USPTO by ConAgra Foods, Inc.

Food Chemistry by H–D. Belitz and W. Croach.

Introductory Nutrition by Helen A. GuLhrie.

The Structure and Composition of Foods by Winton.

Kim's document submitted to Federal Prosecutor and the American Bar Association.

Fedreal Circuit's Sep. 20, 2006 Opinion in *Kim* v. *ConAgra Foods, Inc.*

Doerry, W. Replacement of Potassium Bromate in White and Variety Breads. AIB Tech. Bull. vol. XIII, Jul. 1991 p. 8 of Potassium Bromate (15 ppm) versus Ascorbic Acid.

Federal Circuit's Sep. 20, 2006 Opinion in *Kim* v. *ConAgra Foods, Inc.*

Page 617 (1986) from Chapter 18 of the Belitz text; Food Chemistry by H–D. Belitz and W. Grosch, Springer–Verlag.

H.–D. Belitz and W. Grosch, Food Chemistry, 1987, p. 617, Springer–Verlag Berlin, Heidelberg, Germany.

* cited by examiner

*Primary Examiner*—Stephen J Stein

(57) ABSTRACT

A method of preparing potassium bromate replacer comprising an ascorbic acid compositon in an effective amount to replace an oxidizing agent of potassium bromate is disclosed. The potassium bromate replacer essentially comprises ascorbic acid, food acid, and/or phosphate. It is a slow acting oxidant that is functional throughout the entire manufacturing process. It is also an effective oxidant that produces properly oxidized dough needed in the production of high quality, yeast-leavened products using various methods of the breadmaking process.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 1, 3, 4 and 9 is confirmed.

Claim 2 was previously cancelled. (Relates to a prior proceeding.)

Claim 6 is cancelled.

Claims 5 and 10 are determined to be patentable as amended.

Claims 7 and 8, dependent on an amended claim, are determined to be patentable.

*5. A potassium bromate replacer composition consisting* [[essentially]] *of by weight:*

(*a*) *about 0.001 to 0.03 parts ascorbic acid as an oxidant per 100 parts flour,*

(*b*) *about 0.015 to 0.2 parts food acid per 100 parts flour, said food acid selected from the group consisting of acetic acid, citric acid, fumaric acid, lactic acid, malic acid, oxalic acid, phosphoric acid, succinic acid, tartaric acid, fruit juice, fruit juice concentrate, vinegar, wine, and mixtures thereof and*

(*c*) *flour*, wherein said food acid is present in an effective amount that slows down oxidation of ascorbic acid to dehydroascorbic acid during a manufacturing process of yeast-leavened products.

*10. A potassium bromate replacer composition consisting* [[essentially]] *of by weight:*

(*a*) *0.001 to 0.03 parts ascorbic acid as an oxidant per 100 parts flour,*

(*b*) *about 0.015 to 0.2 parts food acid per 100 parts flour, said food acid selected from the group consisting of acetic acid, citric acid, fumaric acid, lactic acid, malic acid, oxalic acid, phosphoric acid, succinic acid, tartaric acid, fruit juice, fruit juice concentrate, vinegar, wine, and mixtures thereof,*

(*c*) *about 0.5 parts yeast food per 100 parts flour, and*

(*d*) *flour*, wherein said food acid is present in an effective amount that slows down oxidation of ascorbic acid to dehydroascorbic acid during a manufacturing process of yeast-leavened products.

* * * * *